Oct. 10, 1950     C. E. BRANICK     2,525,114
TIRE INVERTER
Filed March 18, 1949     2 Sheets—Sheet 1
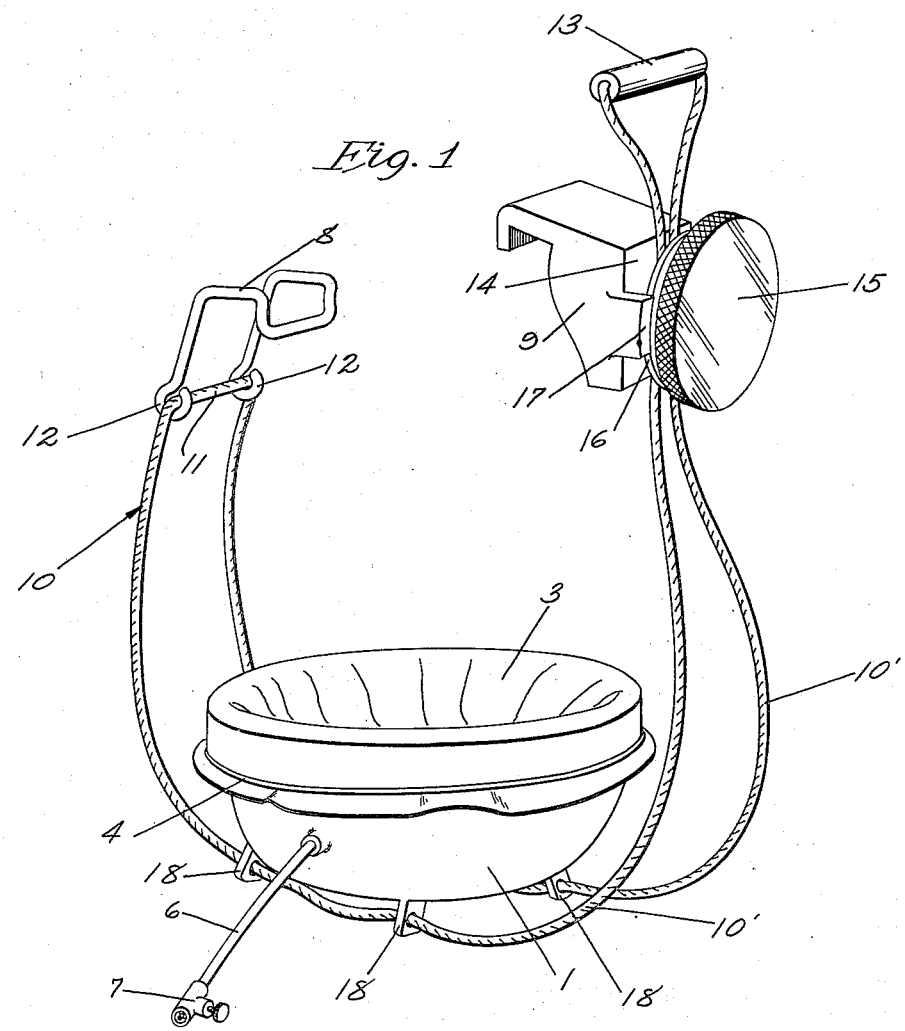
Inventor.
Charles E. Branick
By his Attorneys
Merchant & Merchant

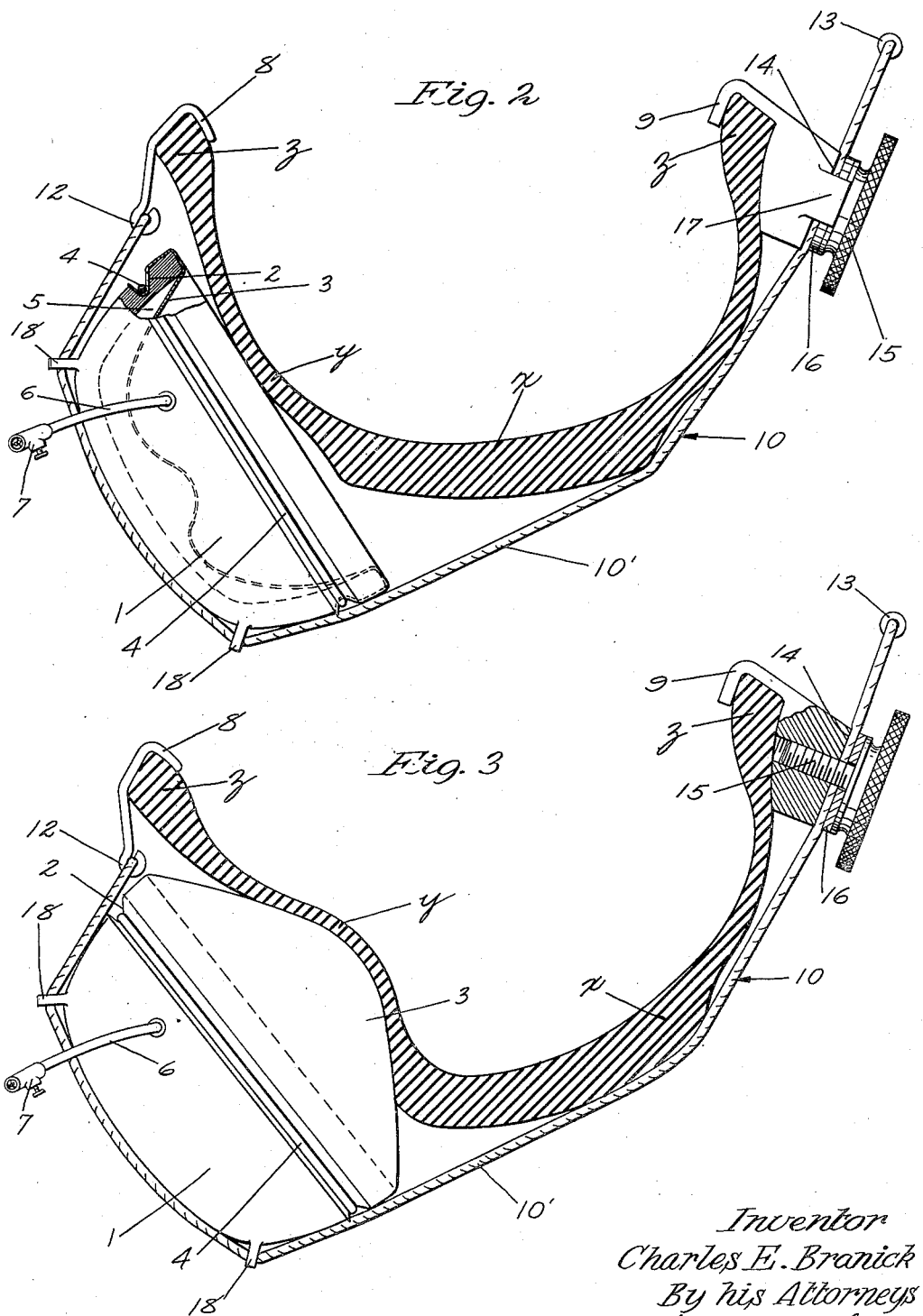

Patented Oct. 10, 1950

2,525,114

UNITED STATES PATENT OFFICE 2,525,114

TIRE INVERTER

Charles Earl Branick, Fargo, N. Dak.

Application March 18, 1949, Serial No. 82,175

8 Claims. (Cl. 254—50.3)

My invention relates generally to tire-repairing equipment and, more specifically, to improvements in devices known in the trade as "inverters."

There have been heretofore produced devices which may be used to spread the beads of a tire apart and thereafter to invert the crown thereof by forcing a ram or the like against the tread portion in the direction of the axis of the tire. By inversion is meant forcing the tire carcass at a given spot to assume a reversely arcuate position to that which it normally occupies. The purpose of such inversion is to facilitate repair to a tire carcass, the cords of which are broken or otherwise damaged only in the inside of the tire, and where it is found not desirable or necessary to extend the repair completely through the wall of the tire. Inverting the tire, as above described, greatly facilitates skiving, buffing, inlaying, and otherwise repairing the injury, assuming, of course, that the device may be so operated as to invert that portion of the tire where the injury lies. However, devices of this type heretofore developed are useful only to invert the crown portion of the tire as distinguished from the side wall portions thereof. Therefore, these devices have but limited use in view of the fact that a large proportion, if not the greater proportion of injuries to the tire casing, occur on the side walls thereof as distinguished from the portion immediately underlying the tread. Where the injury is close to the bead or on the side wall, the inverters heretofore developed are useless because, instead of inverting the portion of the casing surrounding the injury, that portion is definitely kinked—thereby making it impossible to skive or otherwise work on the injury.

The primary object of my invention is the provision of a device in which the inverting force is shiftable with respect to the bead-engaging hooks and which may, therefore, be used to invert any portion of a pneumatic tire from bead to bead thereof.

A still further object of my invention is the provision of a device of the type described, which may be used in conjunction with any known tire spreader, or, under some conditions, without any tire spreader.

A still further object of my invention is the provision of a device of the above type, which is inexpensive to manufacture, relatively light in weight, easy to apply to a tire, and which may be operated with a minimum of skill.

Another object of my invention is the provision of a device which may be readily adjusted to tires of varying sizes within limits.

The above and still further objects and advantages of my invention will become apparent from the following detailed specification, appended claims, and attached drawings.

Referring to the drawings, wherein like characters indicate like parts throughout the several views:

Fig. 1 is a perspective view of my novel device;

Fig. 2 is a transverse section of a pneumatic tire casing showing in side elevation my novel device applied thereto, some parts being broken away and some parts shown in section; and Fig. 3 is a view corresponding to Fig. 2, but showing a different position of some of the parts.

Referring with greater particularity to the drawings, the numeral 1 indicates a rigid cup-shaped body formed from any suitable material and which is provided at its outer surface below the open end thereof with a circular channel 2. A flexible fluid-tight head-forming diaphragm 3 is shown as closing the open end of the cup-shaped body 1 and is tightly held thereto by means of a sealing ring 4 in the channel 2. It will be noted that the cavity 5 in the body 1 and the diaphragm 3 cooperate to provide a fluid chamber. As shown, the diaphragm has sufficient fullness to permit the same to be extended to the position of Fig. 3 when air or other suitable fluid under pressure is admitted into the cavity 5 in the head through a suitable air hose 6, or may be contracted to the position of Fig. 1 by releasing the air or other fluid from the cavity 5 through the air hose 6 by manipulation of a suitable release valve 7.

Adapted to engage the opposite beads of a tire are a pair of bead-engaging hook elements 8 and 9 respectively, which are connected by flexible means, preferably and as shown, in the nature of a wire cable 10. Cable 10 is preferably of a single length formed in U-shape to provide laterally-spaced elements 10' and a base portion 11. As shown, the hook element 8 is provided with eyelets 12 which pivotally receive therein the base portion 11. The opposite free ends of the cable 10 are secured together within a handle element 13. Hook element 9 is in the nature of a block having a clamping face 14. A washer-equipped clamping screw 15 has threaded engagement with the hook element 9, whereby to clamp opposite side elements 10' between the washer 16 and the clamping face 14 of hook 9. Hook 9 is provided with a pair of laterally outwardly-projecting ears 17 (one of which is shown), which prevent escape of cable elements 10' from between clamping face 14 and washer 16 when the clamping screw 15 is loosened.

It will be seen that cable elements 10' pass through laterally-spaced pairs of perforated lugs 18 which preferably are formed integral with body 1 and project laterally outwardly therefrom. In this manner, the body 1 is slidably adjustably secured to the cable 10 for movements longitudinally thereof.

The tire X is first placed in a tire spreader and the beads Z thereof are spread apart in the vicinity of the break Y. Next, the hook element 8 is applied to one bead Z and the body 1 is slidably adjusted on the cables 10 to a position contacting the outside of the tire X immediately underlying the break Y. Thereafter, the hook element 9 is placed over the opposite bead Z of the tire X and the cable 10 is slidably moved therethrough by means of handle element 13, whereby to remove the slack from the cable 10, and the clamping screw 15 tightened. To facilitate skiving and other preparation, air or other suitable fluid under pressure is admitted through the air hose 6 into the cavity 5 in head 1. In this manner, the head-forming diaphragm 3 is forced outwardly to the position of Fig. 3. The fluid is allowed to escape from the chamber defined by the cavity 5 in the head 1 and the diaphragm 3 through a suitable escape valve 7. From the above, it should be apparent that my device may within limits be used to invert tires of varying cross-sectional dimensions, because of the fact that the hook element 9 is longitudinally adjustably secured to the cables 10'. Furthermore, my device may be used in conjunction with practically any tire spreader and may be used successfully to inwardly bulge or invert any spot on the inner side of the tire from bead to bead.

While I have shown and described a preferred form of my invention, it should be obvious that the same is capable of considerable modification without departure from the spirit and scope of the invention as defined by the claims.

What I claim is:

1. In a device of the class described, a pair of hook elements adapted to engage opposite bead portions of a pneumatic tire, flexible means adapted to pass cross-sectionally around the exterior of a tire casing intermediate the beads thereof and connecting said hook elements, a cup-shaped body carried by said flexible connecting means intermediate said hook elements, and a fluid pressure extensible and retractible head closing the open end of said cup-shaped body and defining therewith a fluid chamber, said head adapted to be forced against the exterior of a tire casing intermediate the bead-engaging hook elements upon admission of fluid under pressure into said chamber.

2. The structure defined in claim 1 in which said body is slidably mounted on said flexible connecting means for movement longitudinally thereof.

3. The structure defined in claim 1 in which one of said hook elements is slidably adjustably secured to said flexible connecting means.

4. The structure defined in claim 1 in which said head is in the nature of a flexible diaphragm.

5. In a device of the class described, a pair of hook elements adapted to engage opposite bead portions of a pneumatic tire, spaced flexible cables adapted to pass cross-sectionally around the exterior of a tire casing intermediate the beads thereof and connecting said hook elements, a body slidably secured to the intermediate portions of said cables for movements longitudinally thereof, said body being provided with a cavity, an extensible and contractible diaphragm covering said cavity and defining therewith a fluid chamber, said diaphragm being adapted to be forced against the exterior of a tire casing intermediate the bead-engaging hook elements upon admission of fluid under pressure into said chamber, and fluid inlet and outlet means connected to said body.

6. The structure defined in claim 5 in which one of said hook elements is adjustably secured to said cables for movements longitudinally thereof.

7. In a device of the class described, a pair of hook elements adapted to engage opposite bead portions of a pnuematic tire, flexible means adapted to pass cross-sectionally around the exterior of a tire casing intermediate the beads thereof and connecting said hook elements, a body slidably adjustably carried by said flexible connecting means for movements longitudinally thereof intermediate said hook elements, extensible and retractible plunger means carried by said body and adapted to be forced against the exterior of a tire casing intermediate the bead-engaging hook elements.

8. The structure defined in claim 7 in which one of said hook elements is longitudinally adjustably secured to said flexible connecting means and the other thereof is pivotally secured to said means.

CHARLES EARL BRANICK.

No references cited.